July 17, 1956  B. E. BERRY  2,755,373
ELECTRIC FLARE
Filed Oct. 16, 1953  2 Sheets-Sheet 1
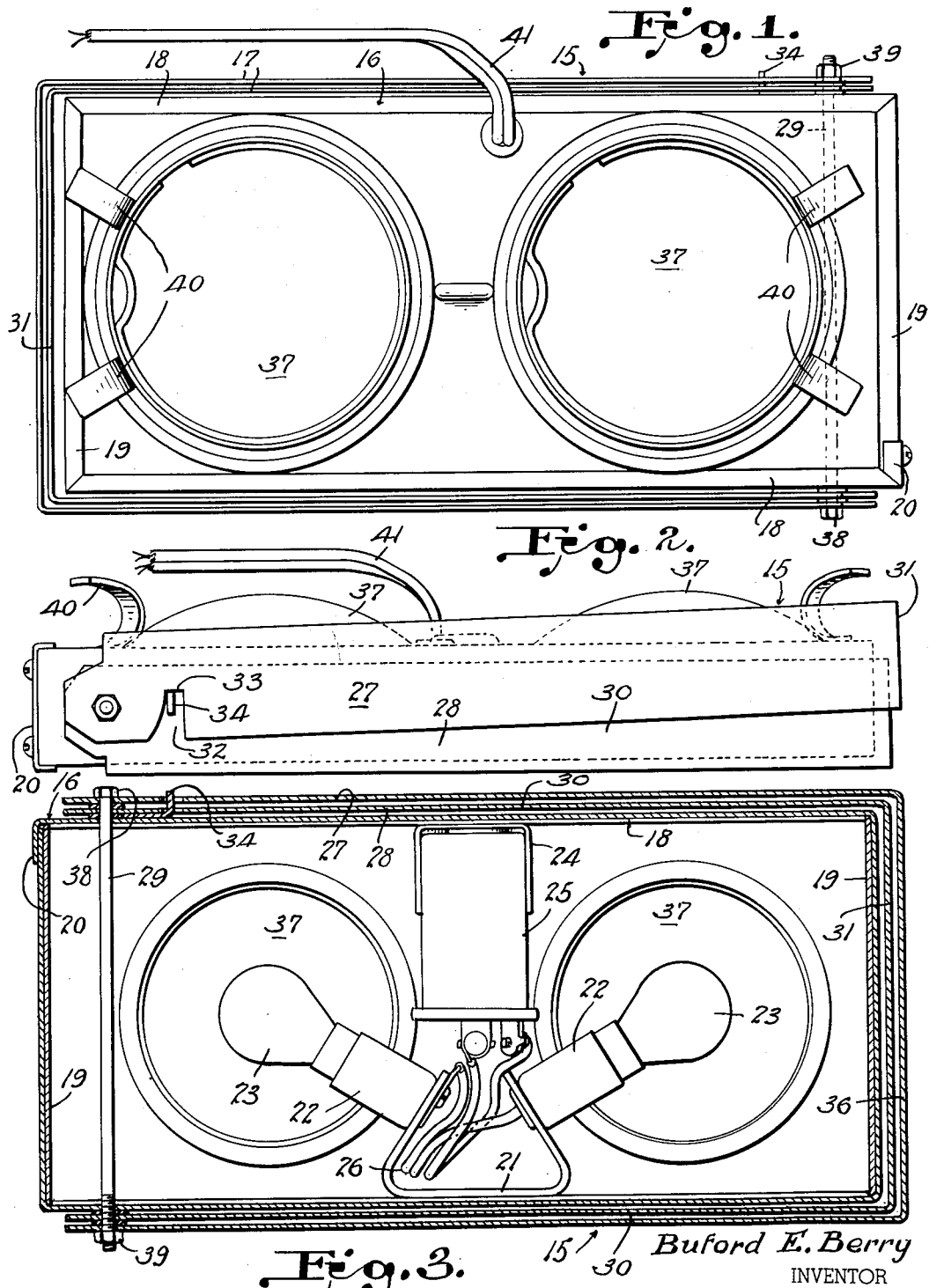
Buford E. Berry
INVENTOR
BY C. A. Snow & Co.
ATTORNEYS.

July 17, 1956 — B. E. BERRY — 2,755,373
ELECTRIC FLARE
Filed Oct. 16, 1953 — 2 Sheets-Sheet 2
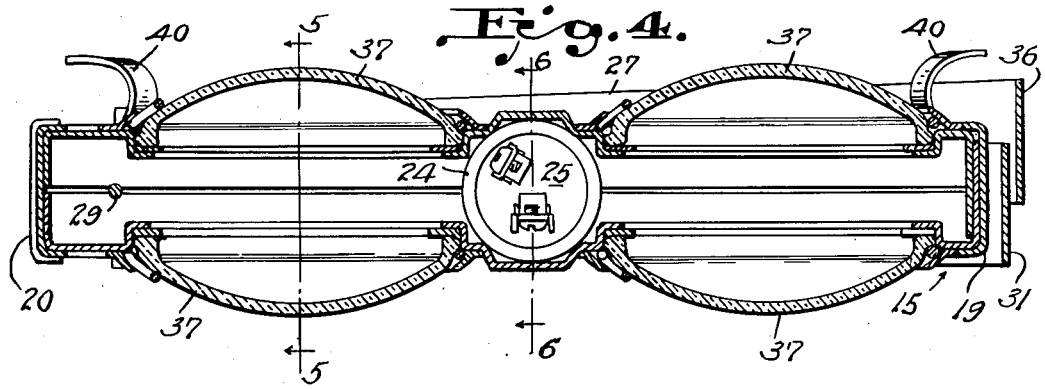
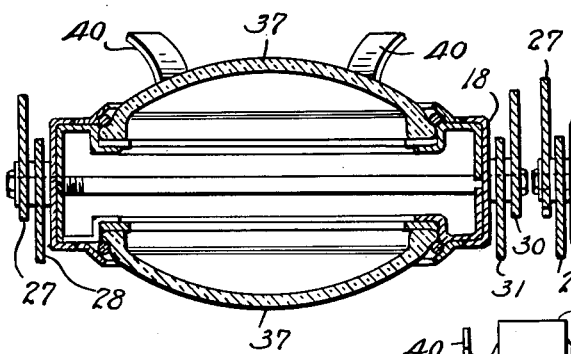
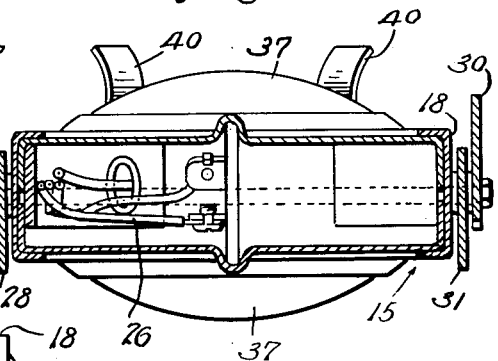
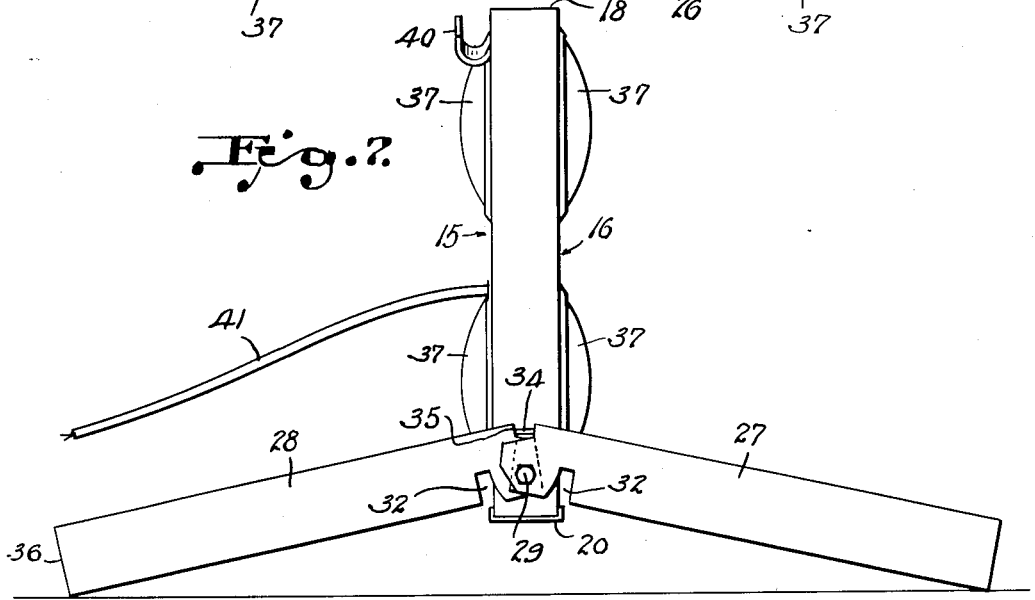
Buford E. Berry
INVENTOR
ATTORNEYS.

United States Patent Office 2,755,373
Patented July 17, 1956

2,755,373

ELECTRIC FLARE

Buford E. Berry, Pascagoula, Miss.

Application October 16, 1953, Serial No. 386,477

1 Claim. (Cl. 240—8.18)

This invention relates to flares and more particularly to an electric flare for connection to a vehicle.

It is an object of this invention to provide an electric flare for connection to a vehicle and supported on the ground spaced from the vehicle for warning other persons that the vehicle may be obstructing the path of movement of other vehicles.

It is another object of this invention to provide an electric flare to be supported on a fixed surface and electrically connected to a vehicle or other source of electric current to illuminate the flare at a distance from the source of electric supply. The electric flare is particularly adapted as an electric replacement of the heretofore conventionally used fire flares for highways and roads as a warning to a person or vehicle which is obstructing the highway or road and that care must be taken by the following vehicle.

It is a further object of this invention to provide an electric flare of the kind to be more particularly described hereinafter which is light in weight and economical in cost of manufacture and distribution.

It is a still further object of this invention to provide an electric flare of this kind having a support for supporting engagement with the ground or other supporting surface with the support being foldable about the flare body with the electric cords coiled around the flare and carried, as in a portion of a vehicle, in a confined space when not in use. When the flare is used with a vehicle, as a tractor or an automobile, and not in active use it may be carried in a box or other receptacle and when in use may be located on the road at a safe distance from the vehicle.

Other and further objects and advantages of the invention will be hereinafter described and the novel features thereof defined in the appended claim.

In the drawings:

Fig. 1 is a top plan view of the electric flare of this invention with the flare in its folded position.

Fig. 2 is a side elevation of the flare in its folded position.

Fig. 3 is a longitudinal horizontal section of the flare.

Fig. 4 is a longitudinal vertical section of the flare.

Fig. 5 is a section through the invention taken on the line 5—5 of Fig. 4.

Fig. 6 is a section through the invention taken on the line 6—6 of Fig. 4.

Fig. 7 is a side elevation of the folding electric flare in its unfolded position.

Because of the use of a large number of automobiles and trucks on present day roads and because of the fact that certain ones of the trucks or automobiles may become an obstruction on the road or highway for other vehicles and because of certain obstructions which may be otherwise occasioned on the highways it has been the custom to provide flares on the road or highway, or adjacent to the road or highway, to warn following vehicles of an obstruction on the highway for further use and travel. Besides the use of flares for indicating a warning for an obstruction on the highway, flares are also used by pedestrians on the highway and on railroads to indicate the presence of a vehicle on the roalroad. Flares are frequently used as a warning of an obstruction in the path of following persons where the flare is carried by certain ones of the persons.

The flare of the present invention is adapted to be connected to a vehicle as an automobile or a truck and placed in or on a road or highway to warn any further persons, either walking or in a vehicle, of the presence of the first vehicle.

The flare of this invention is generally designated by the numeral 15 in the drawings and is adapted to be illuminated by the electricity of the vehicle, either an automobile or a truck, and may be folded from a compact folded up position to be carried in the vehicle to an extended position for supporting on the road and connected to the vehicle at a considerable length thereto.

The electric flare 15 is formed of a rectangular frame 16 having supporting members 17 foldable along the length of the frame as clearly shown in Figs. 1 to 4 of the drawings. The rectangular frame 16 is open at the front and rear sides thereof and is provided with longitudinally extending side frame members 18 and transversely extending frame members 19 as shown in Fig. 3 of the drawings. The longitudinally extending frame members 18 are provided with a flange 20 at one end thereof for securing to the opposite end of the transversely extending frame members 19 to complete the frame 16 of the flare 15. The flare frame 16 is preferably made of metal.

A V-shaped support 21 is secured to one of the longitudinally extending frame members 18 within the frame 16 and two sides of the V-shaped frame are formed for supporting a light bulb socket 22. As a pair of light bulbs 23 are adapted to be supported within the frame 16, a separate light bulb socket 22 is secured to one of the sides of the V-shaped support in opposition to the light bulb socket 22 in another of the arms of the support. A U-shaped shell, opening in the direction of the support 21 is fixedly carried by one of the longitudinally extending frame members 18 opposite from the sockets 22 and a blinker 25 is adapted to be firmly supported within the shell 24 and the blinker 25 is operatively connected to the terminal of the light bulbs 23 by way of electric leads 26 as clearly shown in Fig. 3 of the drawings.

A pair of U-shaped supporting members 27 and 28 are hingedly carried by the frame 16 by a pivot bolt 29 at one end thereof and both of the U-shaped supporting members 27 and 28 are adapted to be pivoted about the pivot pin 29 from a substantially horizontally extending position relative to the frame 16, as clearly shown in Fig. 7 of the drawings, to a folded position overlying the opposite side frame members 18 of the frame.

The innermost ends of the U-shaped supporting members 27 and 28 are formed with a longitudinally extending arm 30 having one end of the U-shaped supporting members 27 and 28 adapted to be pivotally connected to the pivot pin or bolt 29 for movement from the extended position for engaging the ground to a folded position overlying the side walls 18 of the frame 16. The other end of the longitudinally extending arms 30 are connected together by bight portions 31 and 36 which are adapted to overlie and be spaced outwardly from one of the transverse frame members 19 in the folded position of the supporting members 27 and 28.

Adjacent to the pivot bolt 29, the side supporting frame arms 30 of the U-shaped supporting arm 27 is provided with a recess cutout 32 having a flat wall 23 at one end thereof with which a stop pin 34 is adapted to be engaged for limiting the pivotal movement of the U-shaped supporting member and for limiting the direction of the pivoted movement. The extreme inner end of the arm 30 of the U-shaped supporting member 27 is formed with a rectangular cutout portion 35 the edges of which are also engageable with the stop pin 34 for limiting the pivotal movement of the supporting members 27 and 28 in their movement to the supporting position as clearly shown in Fig. 7 of the drawings.

In the folded position of the flare 15, the U-shaped supporting members are moved to their folded position with the bight portion 31 and 36 overlying the end of the frame 16 and the supporting members 27 and 28 are limited in their folding motion by the stop pin 34 so that the bight portions of the supporting members are in overlying position relative to one end of the frame with the bight portion 36 of the supporting member 27 overlying and being slightly spaced outwardly from the supporting member 28 and its bight member 31.

In the extended positions of the supporting members 27 and 28 for engaging the ground or other supporting device, the supporting members are pivoted to an outwardly extended position shown in Fig. 7 so that the frame 16 is supported in an upwardly extending position relative to the ground and to the supporting members.

The stop element 34 is formed as an outwardly extending pin on the frame 18 also engageable in spaced relation above the pivot 29 between the inner supporting member 28 so that the stop pin may extend outwardly within the recesses 32 of each of the supporting members 27 and 28 for limiting the pivotal movement of the supporting members.

A lens 37 is supported on the opposite sides of the light bulb 23 and the lens 37 may preferably be formed of glass or plastic of a warning color as red to be illuminated by the light bulbs 23 when the flare 15 is supported in a road and the light bulbs are connected to a battery of the automobile or truck or any other source of electric current supply, not shown in the drawings. Two such bulbs and lenses are shown in the drawings and more or less lights may be supported in the body or frame 16 as may be required by the laws or by the desires of the person using the flare 15.

Preferably the pivot pin 29 is formed as an elongated bolt having a head 38 at one end thereof and threaded at the other end for the threaded engagement of a nut 39 but it is to be understood that other types of pivot means may be used for pivoting the supporting members to the frame or body. The elongated bolt 29 and removable nut 39 are used at the present time because it appears that the use of the elongated bolt and detachable nut lends itself to a readily manufactured pivot for the flare 15.

An elongated electric cord 41 is extended from the frame 18 and is connected at one end to both of the light bulbs 23 and at the other end to a source of electric power as an electric socket carried by the vehicle and not shown in the drawings.

In the use of the electric flare 15 the U-shaped ground engaging supporting members 27 and 28 are initially unfolded to their unfolding position in engagement with the ground or other supporting surface with the frame 16 extending vertically from the ground and at an angle to both of the supporting members 27 and 28. In this unfolded position, the pivot pin 34 is engaged in the cutout portion 35 of each of the longitudinally extending arms of both of the U-shaped supporting members 27 and 28 as clearly shown in Fig. 7 of the drawings and the electric cord 28 is extended to a source of electric supply, not shown in the drawings, for illuminating the electric light bulbs 23 and thereby making the flare 15 quite conspicuous on the road or highway. When the electric flare 15 is to be stored in the vehicle the electric cord is removed from the source of supply and wound about the open sided hooks 41 and the supporting members 27 and 28 are folded about the pivot 29 into their overlying position relative to the frame 16 and relative to each other. The pivotal movement of both of the supporting members 27 and 28 is about 270° from the ordinary horizontally extending supporting position to the overlying position relative to the frame 16. Both of the supporting members 27 and 28 are adapted to be moved 270° from their folded position overlying the frame 16 to their unfolded position for supporting the frame on a supporting surface. As the side arms 30 of the inner supporting member 28 are adapted to be positioned between the outer arms 30 of the outer supporting member 27 the entire inner supporting member 29 is adapted to be folded within the outer U-shaped supporting member 27 between the outer supporting member and the frame 16. The supporting members are positioned in horizontal alignment extending in opposite directions in the extended position supporting the flare and will be pivoted in opposite directions for folding the flare to the compact position.

While the specific details of one embodiment of this invention have been herein shown and described, the invention is not confined thereto as changes and alterations may be made without departing from the spirit and scope thereof as defined in the appended claim.

I claim:

An electric flare comprising a substantially rectangular frame, oppositely disposed pairs of lenses in said frame, a light bulb between each pair of lenses, a socket for each bulb, means supporting said sockets in said frame, a pair of U-shaped frame supporting members disposed with the parallel legs thereof on the outer sides of said frame and with the bights thereof disposed at one end of the frame, means pivotally securing said legs to the frame sides adjacent the opposite end of the frame, and an outwardly projecting lug carried by said frame adjacent said opposite end in a position to be engaged by said legs when said U-shaped members are swung outwardly to frame supporting position, said U-shaped members in the frame supporting position thereof being disposed in downwardly divergent position.

References Cited in the file of this patent

UNITED STATES PATENTS

| Number | Name | Date |
| --- | --- | --- |
| 1,224,463 | Hawthorne | May 1, 1917 |
| 1,326,650 | Doerr | Dec. 30, 1919 |
| 2,034,100 | Hoefflinger | Mar. 17, 1936 |
| 2,235,280 | Carver | Mar. 18, 1941 |
| 2,235,282 | Carver | Mar. 18, 1941 |
| 2,520,236 | Carver | Aug. 29, 1950 |
| 2,638,584 | Fortney | May 12, 1953 |